June 11, 1935.  F. WINKLER  2,004,740

SPRING MOUNTED CYCLE HUB WITH BRAKE

Filed Nov. 19, 1932  2 Sheets-Sheet 1

Inventor

Franz Winkler

June 11, 1935.  F. WINKLER  2,004,740
SPRING MOUNTED CYCLE HUB WITH BRAKE
Filed Nov. 19, 1932  2 Sheets-Sheet 2
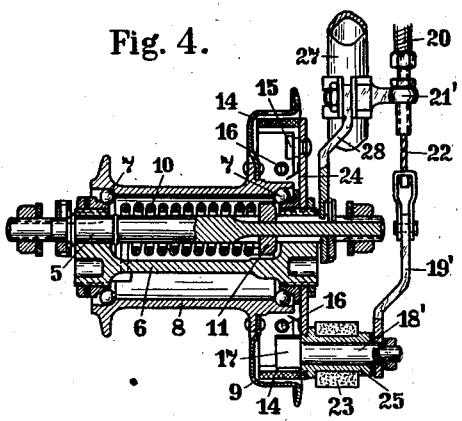
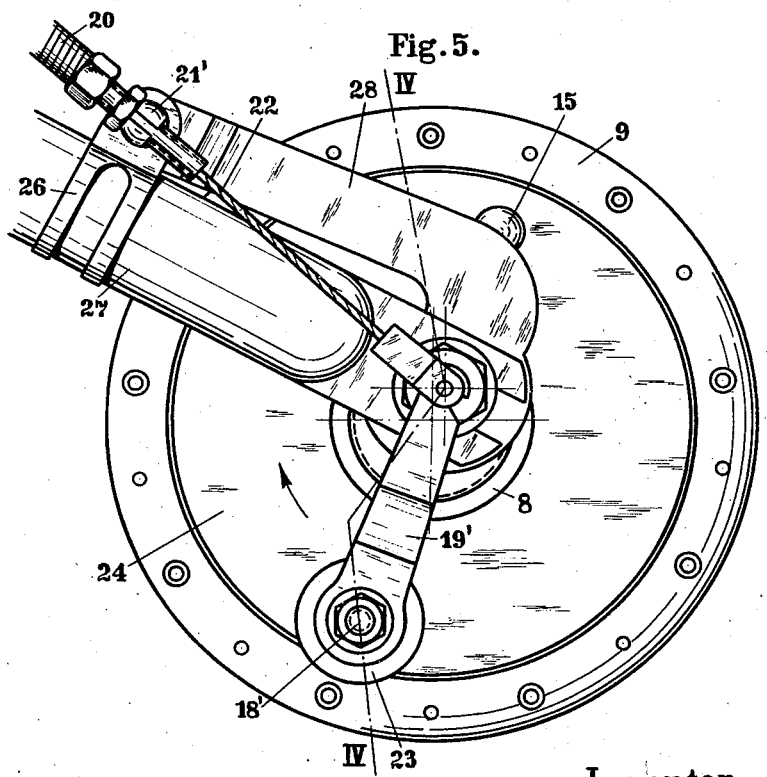
Inventor
Franz Winkler
per
Dean Fairbank Hirsch Foster
his Attorneys Patented June 11, 1935

2,004,740

UNITED STATES PATENT OFFICE 2,004,740

SPRING-MOUNTED CYCLE HUB WITH BRAKE

Franz Winkler, Schweinfurt, Germany

Application November 19, 1932, Serial No. 643,308
In Germany November 20, 1931

5 Claims. (Cl. 188—26)

The invention relates to a vehicle wheel hub particularly for bicycles and motor cycles, and of the general type in which there is provided a bearing member upon which the hub is rotatable, this bearing member being yieldingly and eccentrically mounted on the wheel axle so as to be pivotal with respect to said axle, the means for yieldingly supporting the bearing member including a spring.

One object of the present invention is to provide a vehicle wheel hub device having a brake which is so mounted and constructed as to permit the hub to have a great deal of springiness during its normal operations, and which so brakes the hub as to permit a predetermined rotation of the hub upon the application of the brake and a stopping of the hub against rotation to prevent the spring from being overloaded or strained.

This object is attained by providing a stop on the bearing member which is in such a position in relation thereto as to permit the hub to oscillate with respect to the axle an amount equal to almost one-half a revolution, so as to give a high degree of elasticity, but acting during the braking to immobilize the brake shoes and prevent the hub from oscillating with respect to the wheel axle, thereby rendering the steering of the vehicle easy. This immobilization will avoid undesired disengagement of the brake parts and relieve the bearing spring from undue strain.

Other objects and special constructions relative thereto will be disclosed in the following description.

Two embodiments of the invention are illustrated, by way of example, in the annexed drawings, which form a part of this specification and in which—

Fig. 4 is an axial sectional elevation of the device in connection with another construction of the brake on the line IV—IV of Fig. 5; and Fig. 5 is an end view of the modified construction of the brake shown in Fig. 4, on a larger scale.

Like numerals refer to like or similar parts throughout all figures of the drawings.

Figure 1:
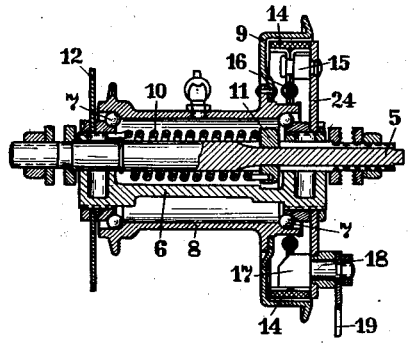
Fig. 1 is an axial sectional elevation of the vehicle hub with the brake, on the line I—I of Fig. 3.

The spring hub in accordance with both embodiments shown as applied to the front wheel of a motor cycle comprises a bearing body 6 eccentrically rotatably mounted on the wheel axle 5 and provided at its ends with ball bearings 7, and the wheel hub 8 carried by the bearing body 6 by means of the said ball bearings which hub is provided with a spoke flange and the housing or drum 9 of an internal brake. The bearing body 6 is recessed from the side in its middle part and the space so formed contains a powerful helical spring 10 placed around the axle 5 and one end of which is fastened to an annular piece 11 non-rotatably connected to the axle while its other end is in engagement with one of the end discs of the bearing body 6. When unloaded, the spring tends to keep the bearing body on the axle in the position shown by Fig. 3 and in which position the center line or axis of the bearing body 6 is a slant below the center line or axis of the axle 5. Under load or jerks the axle descends so that its center line gets by the side of or below the center line of the said bearing body, in which case the spring 10 is put under tension so as to have the tendency to bring the several parts again into their initial position. A pointer plate 12 allows the correct adjustment of the bearing body in the cycle frame.

Figure 2:
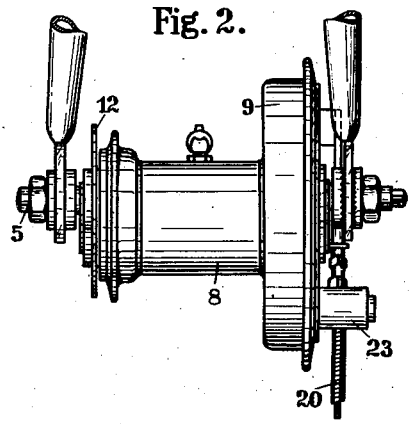
Fig. 2 represents a side view of the entire device and shows its mounting in the fork of a vehicle.
Figure 3:
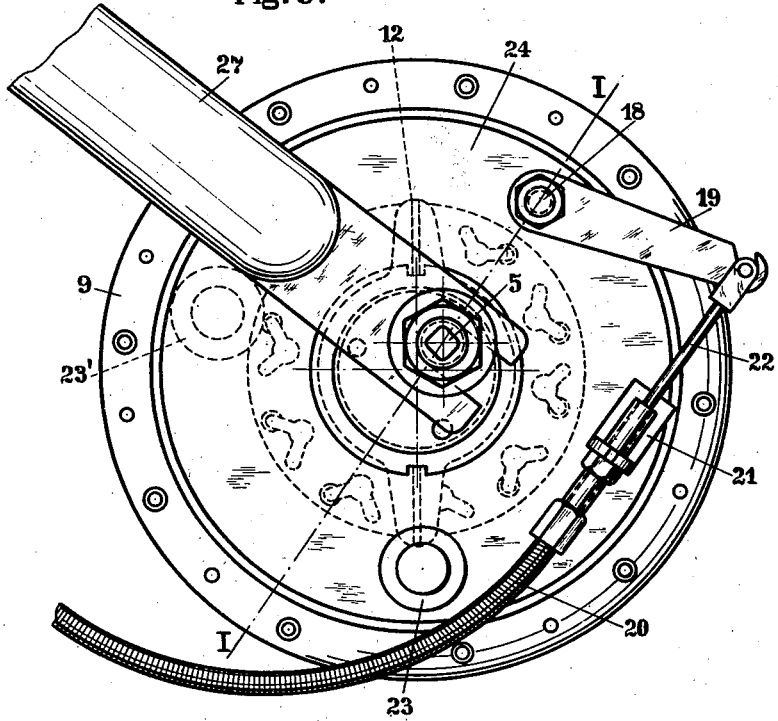
Fig. 3 is an end view of the brake on a larger scale.

The brake located in the housing 9 of the hub 8 consists in the embodiment shown in Figs. 1-3, of an expansible cheek brake of the well-known type, the cheeks or shoes 14 being pivotal about a trunnion 15. In the neutral position of the brake, a spring 16 draws the cheeks towards each other so that they are prevented from contacting the housing 9. The trunnion 15 is secured to the inside of a disc 24 which is fastened to the adjacent end of the bearing body 6 and at the same time serves as a closing cover of the housing 9. As usual in the case of such brakes, the cheeks are spread out by means of an eccentric or toggle 17 the pivot 18 of which can be turned by means of a lever 19 secured thereon in such a way that the cheeks are withdrawn from each other and pressed on to housing 9. The lever 19 is operated by the driver with the aid of a Bowden cable the flexible guiding tube 20 of which is adjustably mounted at its end on a bracket 21 fastened to the exterior face of the disc 24. The wire 22 guided within the tube 20 acts upon the free end of the lever 19. As, after the brake having been operated, the wheel would carry with it the brake and the bearing body 6 when rotating, the disc 24 is further provided with a rubber-coated stop 23 which is caused to bear against the fork 27 during braking, as shown in dotted lines by Fig. 3 so as to prevent the brake from rotating. In the loaded condition of the wheel the stop 23 ordinarily occupies a middle position between the two positions 23 and 23' so that while the brake grows effective, the disc 24 and the bearing body 6 accomplish a very slight angular displacement only about the axle 5. During this angular displacement, the spring 10 already takes up a part of the torque of the hub so that the brake is acting rather softly.

The operation of the device is as follows. The spring 10 tends to maintain the bearing body in such a position that the axle 5 remains in about its highest position within the hub (Fig. 3). When the cycle is loaded, the bearing body turns in the hub so as to lower the axle correspondingly, while jerks produced by unevenness of the road or other causes make the wheel rise until the axle has reached its lowest position within the hub. Braking is accomplished by the brake cheeks 14 being spread by means of the Bowden cable and lever 19 and pressed against the inside of the housing 9. As the disc 24 is rigidly mounted on the bearing body 6, the hub entrains the brake and the bearing body until the stop 23 has struck the back of the fork 27 as shown in Fig. 3 by dashed lines. This having been done, the brake and the bearing body are prevented from further turning and the braking pressure is transmitted to the fork.

In the embodiment illustrated by Figs. 4 and 5, the brake is so arranged that the device intended for operating the brake acts more efficiently. To this end the device referred to is attached to the tube 27 of the fork, the bracket 21' being fastened to a clip 26 which connects to the fork tube 27 the end of an arm 28 intended for preventing the axle 5 from rotating. In this way the guiding tube 20 and the wire 22 are directed towards the axle 5. Moreover the pivot 18' of the toggle 17 is mounted within a sleeve 25 carrying the buffer 23, and the arm 19' fastened to the outer end of the pivot pin 18' is directed towards the center of the axle where the brake wire 22 engages with its free end. In the construction of Fig. 4, the axle at the left-hand end thereof is provided with grooves (indicated in dotted lines) communicating with a greasing device whereby suitable lubrication is supplied between the axle 5 and the surface of the bearing member 6 contacting with said axle and may also be conducted into the interior of the hub 8.

This arrangement works in the following manner. During braking, which is started by the wire 22 being pulled whereupon the lever 19' causes the braking cheeks 14 to bear against the housing, the hub carries the brake and the bearing body 6 with it in the direction of the arrow until the buffer 23 strikes the back of the fork 27. Notwithstanding the free end of the lever 19' remains in the neighbourhood of the center of the hub so that the wire 22 changes its direction but slightly and its action on the lever 19' is practically not modified.

The hub with brake can be modified in several ways as may easily be seen from the foregoing specification. What I therefore claim as the invention is—

1. In a vehicle wheel construction of the class described, an axle, a bearing member eccentrically mounted on said axle, a hub shell rotatable upon said bearing member, a brake drum connected to said hub shell, brake shoes carried by said bearing member, a brake applying lever pivotally supported on said bearing member at a point spaced from the axis of said shell, and extending substantially radially with respect to said hub shell, and a cable extending substantially radially with respect to said hub shell and connected to the free end of said lever near the axis of said hub shell for operating said lever.

2. A device of the class described including a wheel axle, a bearing member eccentrically mounted on said axle and bodily rotatable thereon, a hub rotatable about said member and supported thereon, a braking device between the bearing member and said hub, and a spring for imparting resiliency to said hub and said bearing member in their oscillatory movement about said axle during normal driving operations and for applying spring resistance to the continued rotation of said hub upon the operation of said braking device, thereby softening the braking shock.

3. A device of the class described including a wheel axle, a bearing member eccentrically mounted on said axle and bodily rotatable thereon, a spring for imparting resiliency to said bearing member in its movement about said axle during normal driving operations, a hub rotatable about said member and supported thereon, a braking device coupling said bearing member and said hub whereby upon application of said braking device the continued rotation of said hub is effected against the action of said spring, thereby softening the braking shock, and a stop mounted for movement with said bearing member, normally spaced from a relatively stationary portion of the device during driving operations and while said braking device is inoperative, and adapted to move into engagement with said stationary portion and against the action of said spring after the application of said braking device.

4. A device of the class described including a wheel axle, a bearing member eccentrically mounted on said axle and bodily rotatable thereon, spring means for imparting resiliency to the mounting between said bearing member and said axle whereby upon normal driving operations the bearing member will resiliently oscillate about said axle, a hub rotatable about said member and supported thereon, a brake drum connected to said hub for rotation therewith, brake shoes carried by said bearing member and rotatable therewith, whereby upon application of said brake shoes upon said drum the continued rotation of said hub is effected against the action of said spring means, thereby softening the braking shock, and means for applying said brake shoes to said brake drum and including a brake shoe applying lever pivotally supported on said bearing member at a point spaced from the axis of said hub, a cable pivotally connected to the free end of said lever at a region a substantial distance from the axis of said hub for operating said lever, and a guide member for said cable and connected to said bearing member.

5. A device of the class described including a wheel axle, a bearing member eccentrically mounted on said axle and bodily rotatable thereon, spring means for imparting resiliency to the mounting between said bearing member and said axle whereby upon normal driving operations the bearing member will resiliently oscillate about said axle, a hub rotatable about said member and supported thereon, a brake drum connected to said hub for rotation therewith, and brake shoes carried by said bearing member and rotatable therewith, whereby upon application of said brake shoes upon said drum, the continued rotation of said hub is effected against the action of said spring, thereby softening the braking shock.

FRANZ WINKLER.